United States Patent
Sugai

(10) Patent No.: US 10,661,657 B2
(45) Date of Patent: May 26, 2020

(54) SLIP CONTROL DEVICE

(71) Applicant: NTN CORPORATION, Osaka-shi, Osaka (JP)

(72) Inventor: Tomohiro Sugai, Iwata (JP)

(73) Assignee: NTN CORPORATION, Osaka (JP)

( * ) Notice: Subject to any disclaimer, the term of this patent is extended or adjusted under 35 U.S.C. 154(b) by 119 days.

(21) Appl. No.: 15/960,973

(22) Filed: Apr. 24, 2018

(65) Prior Publication Data

US 2018/0236875 A1 Aug. 23, 2018

Related U.S. Application Data

(63) Continuation of application No. PCT/JP2016/081855, filed on Oct. 27, 2016.

(30) Foreign Application Priority Data

Nov. 2, 2015 (JP) .................. 2015-215393

(51) Int. Cl.
*B60K 1/02* (2006.01)
*B60K 28/16* (2006.01)
(Continued)

(52) U.S. Cl.
CPC ............... *B60L 3/102* (2013.01); *B60K 1/02* (2013.01); *B60K 28/16* (2013.01); *B60L 15/20* (2013.01);
(Continued)

(58) Field of Classification Search
CPC ...... B60L 15/20; B60L 3/102; B60L 2220/44; B60L 2220/46; B60L 2250/26;
(Continued)

(56) References Cited

U.S. PATENT DOCUMENTS

| 4,953,076 A | * | 8/1990 | Yamamoto | ............. | G05B 11/42 |
| | | | | | 318/621 |
| 5,544,039 A | * | 8/1996 | Hiroi | ................... | G05B 13/048 |
| | | | | | 700/31 |

(Continued)

FOREIGN PATENT DOCUMENTS

| JP | 2885544 | 2/1999 |
| JP | 2002-229605 | 8/2002 |

(Continued)

OTHER PUBLICATIONS

Japanese Office Action dated Aug. 20, 2019 in corresponding Japanese Patent Application No. 2015-215393.

(Continued)

*Primary Examiner* — Stephen Holwerda

(57) ABSTRACT

A PI/PID controller that generates a torque compensation value $K_{PID}$ through PI control or PID control, from a deviation between an allowable rotation speed and a rotation speed of a wheel; an adder that adds the torque compensation value to a torque command input value received from a higher-order controller, thereby obtaining a torque command output value; and a dead time compensator that has a control target model including a dead time and that applies a dead time compensation in generation of the torque compensation value by the Smith method. An input to the dead time compensator is an output of a P compensation or a PD compensation excluding an I compensation from a PI compensation or a PID compensation.

5 Claims, 4 Drawing Sheets

(51) Int. Cl.
*B60L 3/10* (2006.01)
*B60L 15/20* (2006.01)
*B60T 8/00* (2006.01)
*B60W 30/18* (2012.01)
*B60W 50/00* (2006.01)

(52) U.S. Cl.
CPC ......... *B60T 8/00* (2013.01); *B60W 30/18172* (2013.01); *B60L 2220/44* (2013.01); *B60L 2220/46* (2013.01); *B60L 2240/24* (2013.01); *B60L 2240/461* (2013.01); *B60L 2240/463* (2013.01); *B60L 2240/465* (2013.01); *B60L 2250/26* (2013.01); *B60L 2260/42* (2013.01); *B60W 2050/0011* (2013.01); *B60W 2050/0054* (2013.01); *B60W 2520/10* (2013.01); *B60W 2520/28* (2013.01); *B60W 2540/18* (2013.01); *B60W 2720/28* (2013.01); *Y02T 10/7275* (2013.01)

(58) Field of Classification Search
CPC ......... B60L 2240/465; B60L 2240/463; B60L 2240/461; B60L 2240/24; B60L 2260/42; B60T 8/00; B60K 1/02; B60K 28/16; B60W 30/18172; B60W 2720/28; B60W 2050/0011; B60W 2050/0054; B60W 2520/10; B60W 2520/28; B60W 2540/18; Y02T 10/7275
See application file for complete search history.

(56) References Cited

U.S. PATENT DOCUMENTS

| | | | |
|---|---|---|---|
| 7,725,201 | B2 | 5/2010 | Zhang et al. |
| 2004/0054440 | A1 | 3/2004 | Zhang et al. |
| 2006/0025917 | A1* | 2/2006 | Pandey .................... B60K 6/46 701/82 |
| 2007/0055433 | A1* | 3/2007 | Yamaguchi ............. B60L 3/102 701/82 |
| 2014/0207323 | A1* | 7/2014 | Yoshida ................... B60K 6/48 701/22 |
| 2014/0231160 | A1* | 8/2014 | Makino ................ B60K 7/0007 180/65.51 |
| 2015/0284005 | A1 | 10/2015 | Suzuki |
| 2016/0243943 | A1 | 8/2016 | Sugai |

FOREIGN PATENT DOCUMENTS

| | | |
|---|---|---|
| JP | 2006-291870 | 10/2006 |
| JP | 3972535 | 6/2007 |
| JP | 2010-178509 | 8/2010 |
| WO | WO 2014/069206 A1 | 5/2014 |
| WO | WO 2015/072384 A1 | 5/2015 |

OTHER PUBLICATIONS

English Translation by WIPO of the International Preliminary Report on Patentability dated May 17, 2018 in corresponding International Patent Application No. PCT/JP2016/081855, 6 pgs.
International Search Report dated Jan. 24, 2017 in corresponding International Patent Application No. PCT/JP2016/081855.
Naoto Abe et al. "Control in time-delay and distributed parameter systems", Corona Publishing Co., Ltd., Mar. 2007, pp. 33-35.
Nahida Naji Kadhim et al., "Simple Controller Approach with Smith Predictor for Long Time Delay Systems" Jan. 1, 2013 (Jan. 1, 2013), ISSN 1813-7822, XP055586970, Retrieved from the Internet: URL: http://www.jeasd.org/images/2013edition/issue_2/4-Simple.Controller.Approach.with.Smith.Predictor.for.Long.Time.Delay.Systems.pdf.
Extended European Search Report dated May 23, 2019 in corresponding European Patent Application No. 16861997.1 (8 pages).

\* cited by examiner

SLIP CONTROL DEVICE

CROSS REFERENCE TO THE RELATED APPLICATION

This application is a continuation application, under 35 U.S.C. § 111(a), of international application No. PCT/JP2016/081855, filed Oct. 27, 2016, which is based on and claims Convention priority to Japanese patent application No. 2015-215393, filed Nov. 2, 2015, the entire disclosure of which is herein incorporated by reference as a part of this application.

BACKGROUND OF THE INVENTION

Field of the Invention

The present invention relates to a slip control device for inhibiting a vehicle tire slip, and particularly relates to a slip control device for, for example, an electric automobile in which left and right wheels are independently driven by drive sources such as electric motors.

Description of Related Art

Conventionally, there are known slip control devices that each prevent a wheel from spinning or being locked at the time of acceleration of the vehicle body or at the time of deceleration of the vehicle body. In recent years, the following types of vehicles have been developed as forms of electric automobiles: a so-called in-wheel motor type vehicle in which motors are incorporated into wheels and the wheels are directly driven by the motors; and a so-called on-board type vehicle in which outputs from two motors installed in the vehicle body corresponding to respective left and right wheels are transmitted to the wheels via drive shafts and the like thereby to control driving torques for the wheels.

These in-wheel motor type and on-board type vehicles each have a characteristic of being able to separately control, for each wheel, driving torque or braking torque to be applied to the wheel. A control device that makes use of this characteristic thereby to perform slip control, is proposed (e.g., Patent Document 1). In this conventional art example, a vehicle controller calculates a motor torque command value on the basis of information from a wheel speed sensor, an accelerator sensor, a brake sensor, etc., and transmits the calculated command value to a motor controller, so that the motor controller controls a motor.

RELATED DOCUMENT

Patent Document

[Patent Document 1] JP Patent No. 3972535
[Patent Document 2] JP Patent No. 2885544

Non-Patent Document

[Non-Patent Document 1] ABE Naoto and KOJIMA Akira, "Control in time-delay and distributed parameter systems", CORONA PUBLISHING CO., LTD., 2007

In the technology disclosed in Patent Document 1, in a case where the speed of communication between the vehicle controller and the motor controller is low when the motor torque command value calculated by the vehicle controller is transmitted from the vehicle controller to the motor controller, there is a possibility that delay in a motor torque command occurs owing to the communication, and motor control to be performed by the motor controller is also delayed. For example, the communication speed of communication by a CAN (control area network) generally employed in an automobile is low, since such communication is time-multiplexed serial communication in which communication between components is sequentially performed on the same wiring.

In an actual control device, a delay in calculation of an inverter in a motor controller, a delay in detection by a wheel speed sensor, and other delays occur besides the above-described delay due to communication speed, and, besides a delay caused by inertia of a wheel, various delays occur from output of a torque command by the vehicle controller to input of a wheel rotation speed that is fed back to the vehicle controller. These delays sometimes include dead time. In a case where the dead time is included, the effect of control input does not immediately appear as an output, and the output is not immediately fed back to the controller, and thus, when the vehicle controller is to perform slip control on the basis of the value of the wheel rotation speed, the control is likely to become more difficult with only PID compensation as the dead time becomes longer.

As a method for improving the controllability of a control system including a dead time, the Smith method disclosed in Non-Patent Document 1 and Patent Document 2 is widely used, for example. The Smith method is a method in which an output, to be obtained after the dead time, is predicted with use of a control target model including a dead time, so that control is stabilized. With this method, although satisfactory response to a target input can be obtained, response to a disturbance may not always be satisfactory. In applying the Smith method to slip control for a wheel, change in a command torque due to, for example, an acceleration operation by a driver and a fluctuation in a reaction force, from a road surface, that acts on a tire act as disturbances, and thus, there is a possibility that the controllability is deteriorated. As a method for improving the response to the inputted disturbances, a method in which a compensator is additionally introduced in a feedback loop so that a two-degrees-of-freedom system is obtained, is proposed. However, by the introduction of the additional compensator, man-hours are required to perform control designing.

SUMMARY OF THE INVENTION

The present invention has been made in order to solve the above-described problems, and an object of the present invention is to provide a slip control device that inhibits a vehicle tire slip in an electric automobile in which each wheel serving as a drive wheel is driven by an electric motor, and that, even in a case where there is a relatively long dead time from output of a torque command by a vehicle controller to input of a wheel rotation speed that is fed back to the vehicle controller, can stably and accurately perform slip control, and enables control designing to be relatively easily performed.

Hereinafter, in order to facilitate the understanding, the present invention will be described with reference to the reference numerals used in embodiments for convenience sake.

A slip control device 1 according to the present invention is a slip control device 1 for inhibiting a tire slip of an automobile in which each wheel 7 serving as a drive wheel is driven by an electric motor 5, the slip control device 1 including:

an allowable rotation speed calculator 12 configured to calculate an allowable rotation speed $\omega_t$ of the wheel 7 from vehicle-state information including a vehicle speed and a steering angle;

a PI/PID controller 13 configured to generate a torque compensation value $K_{PID}$ through PI control or PID control, from a deviation between the allowable rotation speed $\omega_t$ and a rotation speed $\omega$ of the wheel 7;

an adder 16 configured to add the torque compensation value $K_{PID}$ to a torque command input value $T_{in}$ received from a higher-order controller 3, thereby obtaining a torque command output value $T_{out}$; and a dead time compensator 17 which has a control target model 18 including a dead time and which is configured to apply a dead time compensation in generation of the torque compensation value $K_{PID}$ by the Smith method.

An input to the dead time compensator 17 is an output $K_{PD}$ of P compensation or PD compensation excluding I compensation from PI compensation or PID compensation.

Here, P represents proportional compensation in the PI or PID control, I represents integral compensation in that control, and D represents differential compensation in that control.

According to this configuration, the PI/PID controller 13 generates the torque compensation value $K_{PID}$ through the PI control or the PID control, from the deviation between the allowable rotation speed $\omega_t$ and the rotation speed w of the wheel, and the adder 16 adds the torque compensation value $K_{PID}$ to the torque command input value $T_{in}$ received from the higher-order controller 3, thereby obtaining the torque command output value $T_{out}$. Therefore, the wheel 7 can be inhibited from slipping. For example, the wheel rotation speed w of each wheel 7 is monitored, and, when the wheel rotation speed $\omega$ of the wheel 7 exceeds the allowable rotation speed $\omega_t$, the torque compensation value is determined through calculation of the PID control or calculation of the PI control based on the deviation between the allowable rotation speed $\omega_t$ and the rotation speed $\omega$ of the wheel 7, whereby the wheel is inhibited from slipping.

With this configuration as a basis, the dead time compensator 17 using the Smith method is provided, and, as a torque to be inputted to the dead time compensator 17, the P compensation (proportional compensation) excluding the I compensation (integral compensation) from the PI compensation, or a sum $K_{PD}$ of the P compensation and the D compensation (differential compensation) excluding the I compensation from the PID compensation, is used. Accordingly, a steady-state deviation due to the dead time compensation by the I compensation (integral compensation) or a torque command value does not occur, whereby the accuracy of control is improved. Therefore, a slip control device can be provided in which, even in a case where there is a relatively long dead time from output of the torque command by the vehicle controller to input of the wheel rotation speed that is fed back to the vehicle controller, slip control can be stably and accurately performed, and control designing can be relatively easily performed.

In the slip control device 1 according to the present invention, the input to the dead time compensator 17 may not include the torque command input value $T_{in}$ given from the higher-order controller 3. That is, the torque command input value $T_{in}$ for driving or braking given from the higher-order controller 3 to the slip control device 1 is not added to the torque to be inputted to the dead time compensator 17. Accordingly, the steady-state deviation due to the dead time compensation by the integral compensation or the torque command value is even further unlikely to occur, whereby the accuracy of control is improved.

In the slip control device 1 according to the present invention, an I compensator 23 included in the PI/PID controller 13 may limit a magnitude of the I compensation based on an absolute value $(AB=|T_{in}|)$ of the torque command input value $T_{in}$ received from the higher-order controller 3. That is, the magnitude of the I compensation, i.e., the integral compensation in the PID calculation or the PI calculation is limited based on the magnitude of the torque command input value $T_{in}$ for driving or braking calculated from, for example, a stroke amount of an accelerator pedal 8 or a pedaling force on a brake pedal 9 by the higher-order controller 3 and that is received by the slip control device 1. Accordingly, responsiveness to changes in a target value and a disturbance (a torque command value $T_{in}$ received from the higher-order controller 3, and a reaction force, from a road surface, that acts on the tire) can be improved.

Specifically, in the slip control device 1 according to the present invention, the dead time compensator may subtract a value outputted from the control target model, from the deviation between the allowable rotation speed and the rotation speed of the wheel, and the PI/PID controller may generate the torque compensation value through the PI control or the PID control, from the resultant deviation obtained by the subtraction. Furthermore, specifically, in the slip control device 1 according to the present invention, the rotation speed, of the wheel, that is used by the PI/PID controller may be a rotation speed obtained by subtracting, from an actual rotation speed of the wheel, an output from an element of the dead time of the control target model.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
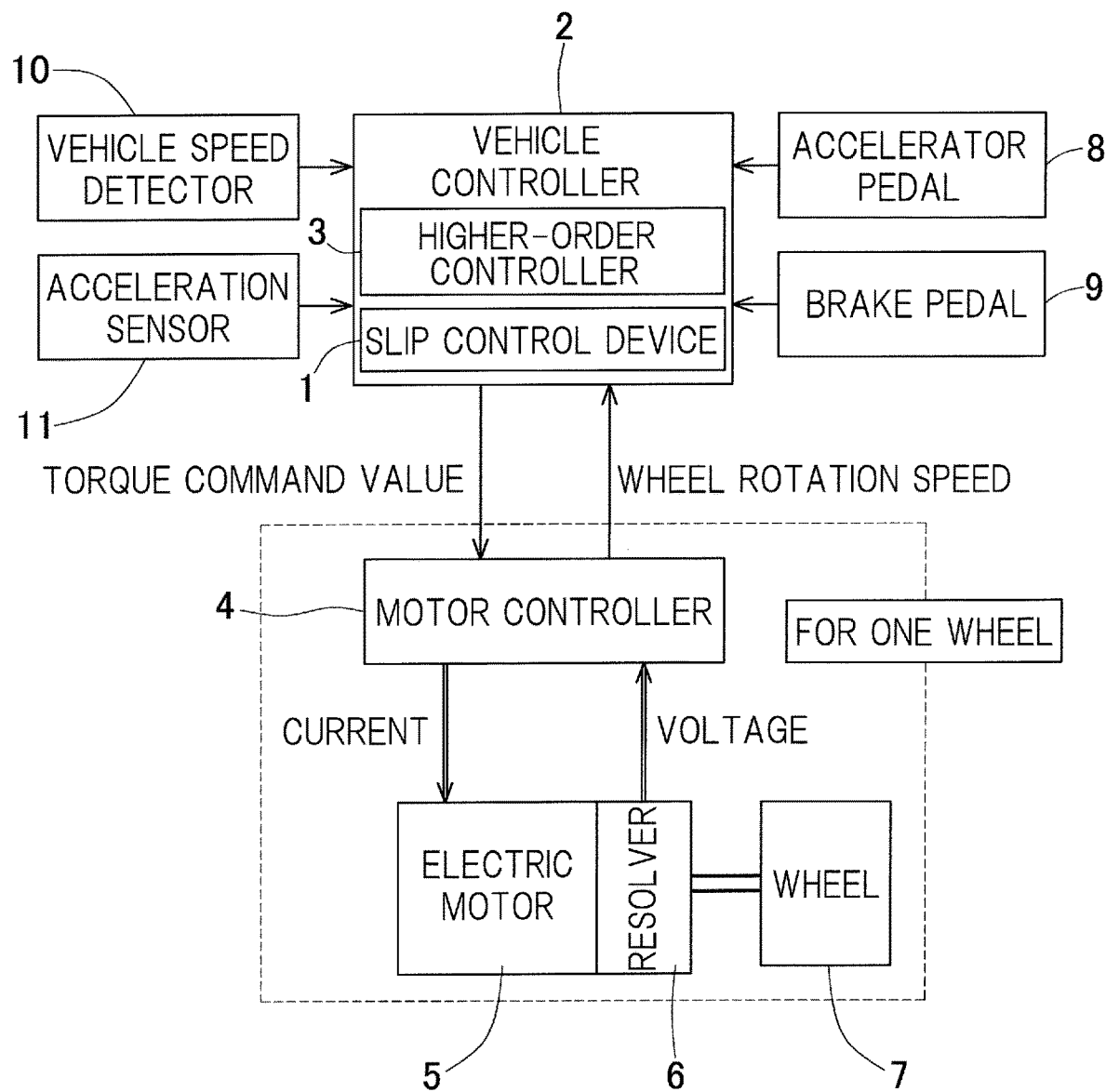
FIG. 1 is a system configuration diagram indicating a control system, of a vehicle such as an electric automobile, that includes a slip control device according to one embodiment of the present invention.

One embodiment of the present invention will be described with reference to the drawings. FIG. 1 is a system configuration diagram indicating a control system, of a vehicle such as an electric automobile, which includes a slip control device 1. The slip control device 1 is provided in a vehicle controller 2. In FIG. 1, a motor controller 4, an electric motor 5, a resolver 6, and a wheel 7 are shown for one of wheels 7, but these components may be provided for each of the wheels 7 serving as drive wheels. For example, the number of each of these components provided in a four-wheel drive vehicle is four. The number of each of these components provided in a two-wheel drive vehicle is two.

The electric motor 5 is a three-phase AC motor such as a synchronous magnet-embedded type or interior permanent magnet motor. The electric motor 5 may be an induction motor or may be a DC motor. The electric motor 5 may be a motor included in an in-wheel motor drive device, or may be an on-board type motor mounted on a chassis (not shown).

Figure 4:
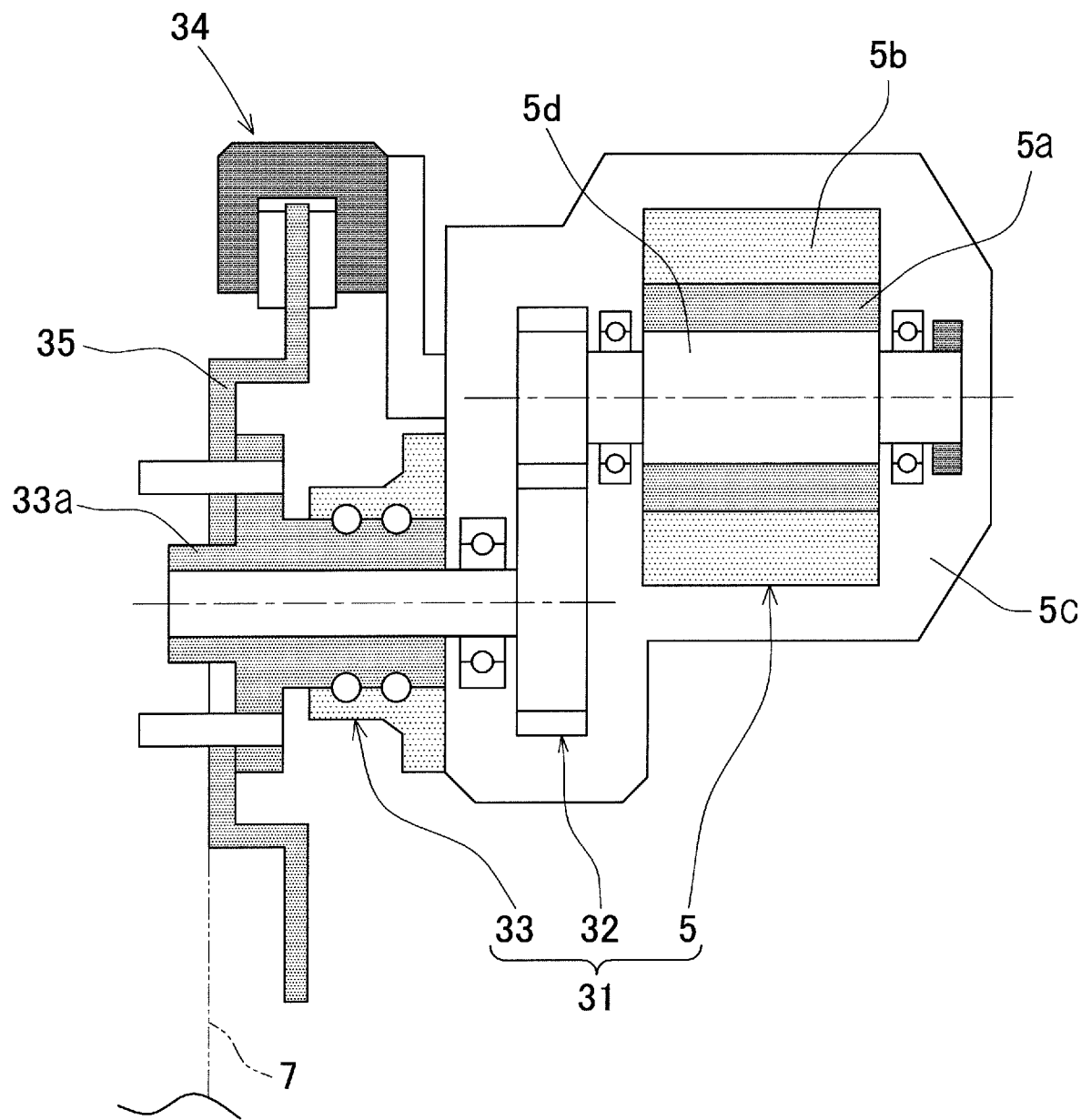
FIG. 4 is a longitudinal-sectional view indicating an example of an in-wheel motor drive device of a vehicle, to which the slip control device is applied.

FIG. 4 shows an example of an in-wheel motor drive device 31. The in-wheel motor drive device 31 includes the electric motor 5, a speed reducer 32, and a wheel bearing 33, and these components are partly or entirely arranged in the wheel 7. Rotation of the electric motor 5 is transmitted to the wheel 7 via the speed reducer or reduction gear 32 and the wheel bearing 33. A brake rotor 35 composing a friction brake device 34 is fixed to a flange portion of a hub ring 33a of the wheel bearing 33, and the brake rotor 35 rotates together with the wheel 7. The electric motor 5 includes: a stator 5b fixed to a housing 5c; and a rotor 5a mounted to a rotation output shaft 5d.

In FIG. 1, the resolver 6 is incorporated in the electric motor 5 and detects a rotation speed, or the number of rotation per unit time, ω of the motor rotor. Instead of the resolver 6, another type of rotation detector (not shown) may be provided. The motor controller 4 has a function of, for example, controlling, in accordance with a given torque command value, an inverter (not shown) for converting DC power of a battery (not shown) into AC power, and a current that is outputted from the inverter. The motor controller 4 is also referred to as an inverter device.

The vehicle controller 2 controls the entire vehicle, is implemented by an ECU (electric control unit), and includes a higher-order controller 3 and the slip control device 1. The higher-order controller 3 and the slip control device 1 may be implemented by separate ECUs. The vehicle controller 2 implemented by the ECU includes: a computer such as a microcomputer with processor; a program that is executed thereby; various electronic circuits; and the like. The vehicle controller 2 and the motor controller 4 are connected to each other via an in-vehicle communication network such as a CAN (control area network).

The higher-order controller 3 has: a function of generating driving and braking commands for each wheel 7 on the basis of operation amounts (served as an acceleration command and a deceleration command) that are inputted from an acceleration operator such as an accelerator pedal 8 and a brake operator such as a brake pedal 9, respectively, and of transmitting the driving and braking commands to the motor controller 4 as torque command values; and a function of performing cooperative control and integrated control of the entire vehicle. As a unit for generating the torque command value, the higher-order controller 3 has, besides the above, a function of adjusting the driving and braking commands for each wheel 7 in consideration of: a vehicle speed detected by a vehicle speed detector 10; the degree of acceleration, of the vehicle, that is detected by an acceleration sensor 11; a steering angle obtained by a steering mechanism (not shown) such as a steering wheel; and the like. The vehicle speed detector 10 detects a vehicle speed that is a speed of the vehicle body, and is configured to detect the rotation speeds ω of the wheels 7 by respective rotation sensors or the like (not shown) and select the highest speed thereamong, or configured to calculate a vehicle speed by integrating the degree of acceleration that are obtained from the acceleration sensor 11.

Figure 2:
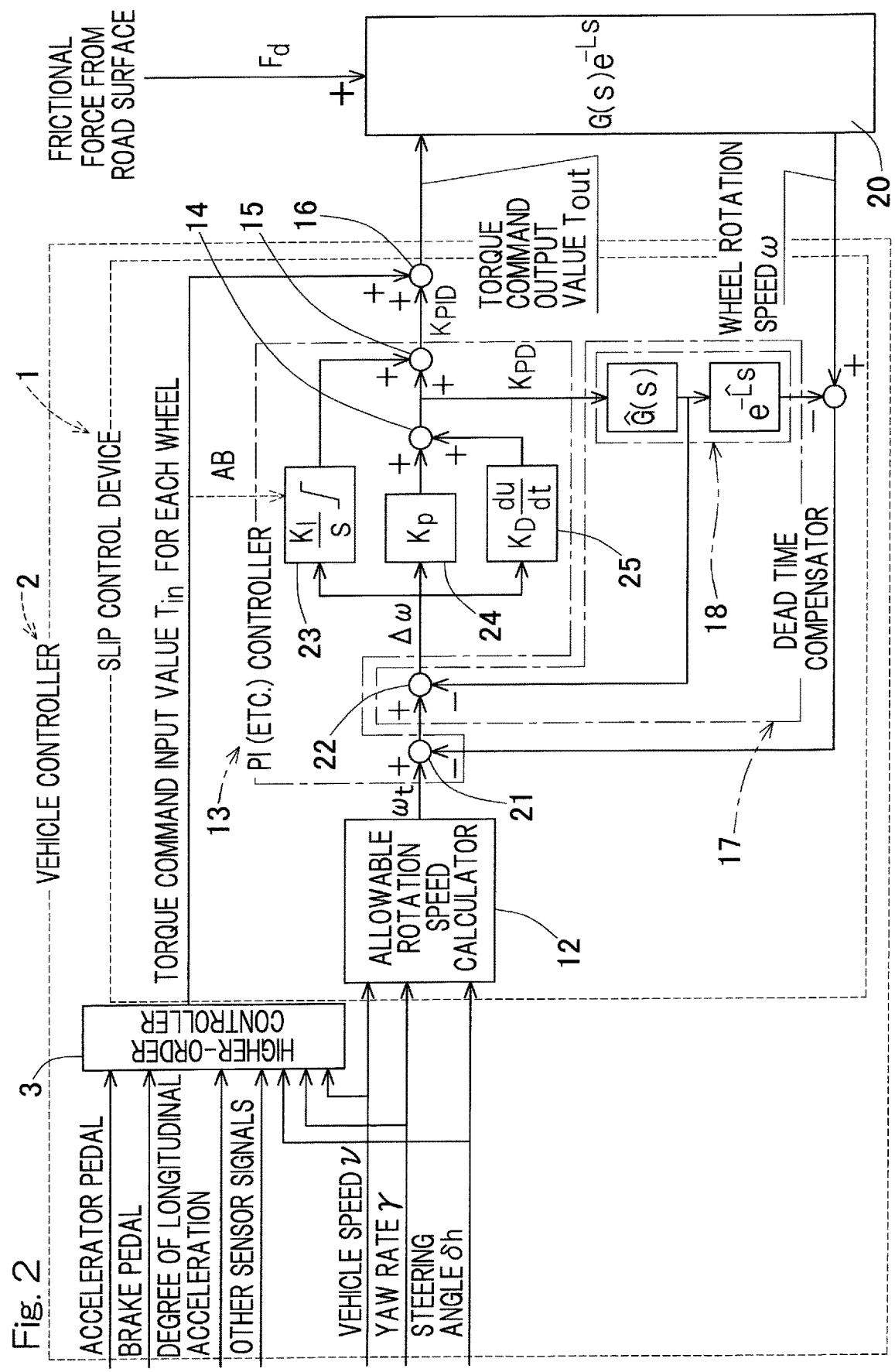
FIG. 2 is a block diagram indicating a schematic configuration of the slip control device.

FIG. 2 is a control block diagram of the slip control device 1, and representatively shows the diagram for only one wheel. The slip control device 1 includes an allowable rotation speed calculator 12, a PI/PID controller 13, an adder 16, and a dead time compensator 17.

The allowable rotation speed calculator 12 calculates an allowable rotation speed $\omega_t$ of the wheel 7 from vehicle-state information including the vehicle speed and the steering angle. Specifically, the allowable rotation speed calculator 12 determines, in accordance with a predetermined rule, an allowable rotation speed $\omega_t$ for inhibition of slipping of the corresponding wheel 7 from, for example, detected values of a vehicle speed V, a yaw rate γ, and a steering angle $\delta_h$. The predetermined rule is appropriately set on the basis of an experiment result, a simulation result, past measured data, or the like.

The PI/PID controller 13 generates a torque compensation value $K_{PID}$ through PI control or PID control, from a deviation between the allowable rotation speed $\omega_t$ and the rotation speed ω of the wheel. In the example in FIG. 2, the PI/PID controller 13 is configured to perform the PID control. The PI/PID controller 13 includes a P compensator 24, an I compensator 23, and a D compensator 25. The P compensation and the D compensation are added by an adder 14 (the output thereof is $K_{PD}$ described below), and the I compensation is added to the resultant addition value by an adder 15 (the output thereof is $K_{PID}$).

The adder 16 adds the torque compensation value $K_{PID}$ to a torque command input value $T_{in}$ received from the higher-order controller 3, thereby obtaining a torque command output value $T_{out}$.

The dead time compensator 17 has a control target model 18 including a dead time and applies a dead time compensation in generation of the torque compensation value $K_{PID}$ based on the Smith method. An input to the dead time compensator 17 is an output (an output $K_{PD}$ from the adder 14) of the P and D compensations excluding the I compensation from the PID compensation by the PI/PID controller 13. In a case where the PI/PID controller 13 is configured to perform PI compensation without performing D compensation, the input to the dead time compensator 17 is an output of the P compensation excluding the I compensation from a PI compensation. In FIG. 2, the input to the dead time compensator 17 does not include any torque command input value $T_{in}$.

A control target 20 includes all of transfer characteristics, etc., of the motor controller 4, the electric motor 5, the wheel 7, and the resolver 6 in FIG. 1, and components interposed therebetween, and is connected to the slip control device 1. In FIG. 2, the control target 20 is represented by $G(s)e^{-Ls}$. $G(s)$ represents a rational transfer function of the control target 20, and $e^{-Ls}$ represents a dead time of the control target 20.

Operations and components of the slip control device 1 having the above-described configuration will be described in detail. As described above, the torque command input value $T_{in}$ for driving each wheel 7 is calculated by the higher-order controller 3 from an operation amount such as a stroke amount of the accelerator pedal 8 or a pedaling force on the brake pedal 9. This calculated value is the torque command input value $T_{in}$ to be received from the higher-order controller 3 by the slip control device 1.

In the PI/PID controller 13, the rotation speed w of the wheel 7 being monitored and the allowable rotation speed $\omega_t$ are constantly compared with each other by a comparison unit 21. In a case where the rotation speed w exceeds the allowable rotation speed $\omega_t$, the PI/PID controller 13 performs PID calculation based on a deviation $\Delta\omega$ between the rotation speed w and the allowable rotation speed $\omega_t$, thereby obtaining a PID calculation value $K_{PID}$. The torque compensation value (PID calculation value) $K_{PID}$ is represented by the following formula.

$$K_{PID}=K_P\Delta\omega(n)+K_I\Sigma\Delta\omega(n)+K_D(\Delta\omega(n-1)-\Delta\omega(n))$$

Here, $K_P$, $K_I$ and $K_D$ represent gain constants of proportional calculation, integral calculation, and differential calculation, respectively.

The integral compensator 23 constantly monitors the torque command input value $T_{in}$ for driving or braking received from the higher-order controller 3 by the slip control device 1, and a calculation value of the integration is limited based on the magnitude (AB=|$T_{in}$|) of an absolute value of the torque command input value $T_{in}$ for driving or braking received from the higher-order controller 3. For example, in a case where a tire is to slip owing to an excessive driving torque command input value $T_{in}$, a negative torque (braking torque) is outputted by the I compensation thereby to reduce the torque command output value $T_{in}$, whereby a slip is inhibited. However, the magnitude of the I compensation is limited by the torque command input value $T_{in}$, and thus, with only the I compensation, the torque command output value $T_{out}$ is zero at the lowest and does not become a negative value. Road surface reaction force acting on the tire from a road surface is always in such a direction that the tire is inhibited from slipping. The only disturbance that causes a tire slip among disturbances acting on the slip control device 1, is a torque command input. Therefore, the controllability is hardly deteriorated even if the above-described limitation is set. On the contrary, owing to the above-described limitation, response to changes in an input and a disturbance is quickly performed, whereby the controllability is improved.

The dead time compensator 17 performs dead time compensation by the Smith method, and applies, as local feedback, a compensation element including a dead time. In the present embodiment, the output from the dead time compensator 17 is, specifically, used so as to be subtracted at the comparison unit 22 from the deviation $\Delta\omega$ between the rotation speed $\omega$ and the allowable rotation speed $\omega_t$ that are inputted to the PI/PID controller 13. In the present embodiment, as shown in FIG. 2, the wheel rotation speed that is used by the PI/PID controller 13 is, specifically, a rotation speed obtained by subtracting, from an actual rotation speed $\omega$ of the wheel 7, an output from a dead time element (dead time model $e^{-Ls}$) of the control target model 18 described below. $\hat{G}(s)$ is a model (rational transfer function) including no dead time in the control target model 18 in the slip control device 1, and $e^{-Ls}$ is a dead time model. The inputted $K_{PD}$ is the sum of proportional and differential compensations excluding the integral compensation from the PID compensation. The input to the dead time compensator 17 is defined as a sum $K_{PD}$ of the proportional and differential compensations excluding the integral compensation from the PID compensation. Also the torque command input value $T_{in}$ is not added to the torque to be inputted to the dead time compensator 17. Accordingly, a steady-state deviation due to the dead time compensation by the integral compensation or the torque command value is unlikely to occur, whereby the accuracy of control is improved.

To the torque command input value $T_{in}$ from the higher-order controller 3, the torque compensation value (PID calculation value) $K_{PID}$ is added by the adder 16 so that the resultant value is used as the torque command output value $T_{out}$ from the slip control device 1.

The allowable rotation speed calculator 12, the PI/PID controller 13, and the dead time compensator 17 are, specifically, configured with a hardware circuit or a software mathematical function on a processor (not shown) that enables calculation and output of a result thereof, with use of an LUT (Look Up Table) implemented by software or hardware, or a prescribed transform function contained in a library of software, or hardware equivalent thereto, and, as necessary, a prescribed target model, or a comparison function or a four arithmetic operation function in the library, or hardware equivalent thereto, etc.

Therefore, even in a case where there is a relatively long dead time from a torque command output from the higher-order controller 3 of the vehicle controller 2 to an input value of the wheel rotation speed $\omega$ that is fed back to the vehicle controller 2, slip control can be stably and accurately performed.

Figure 3:
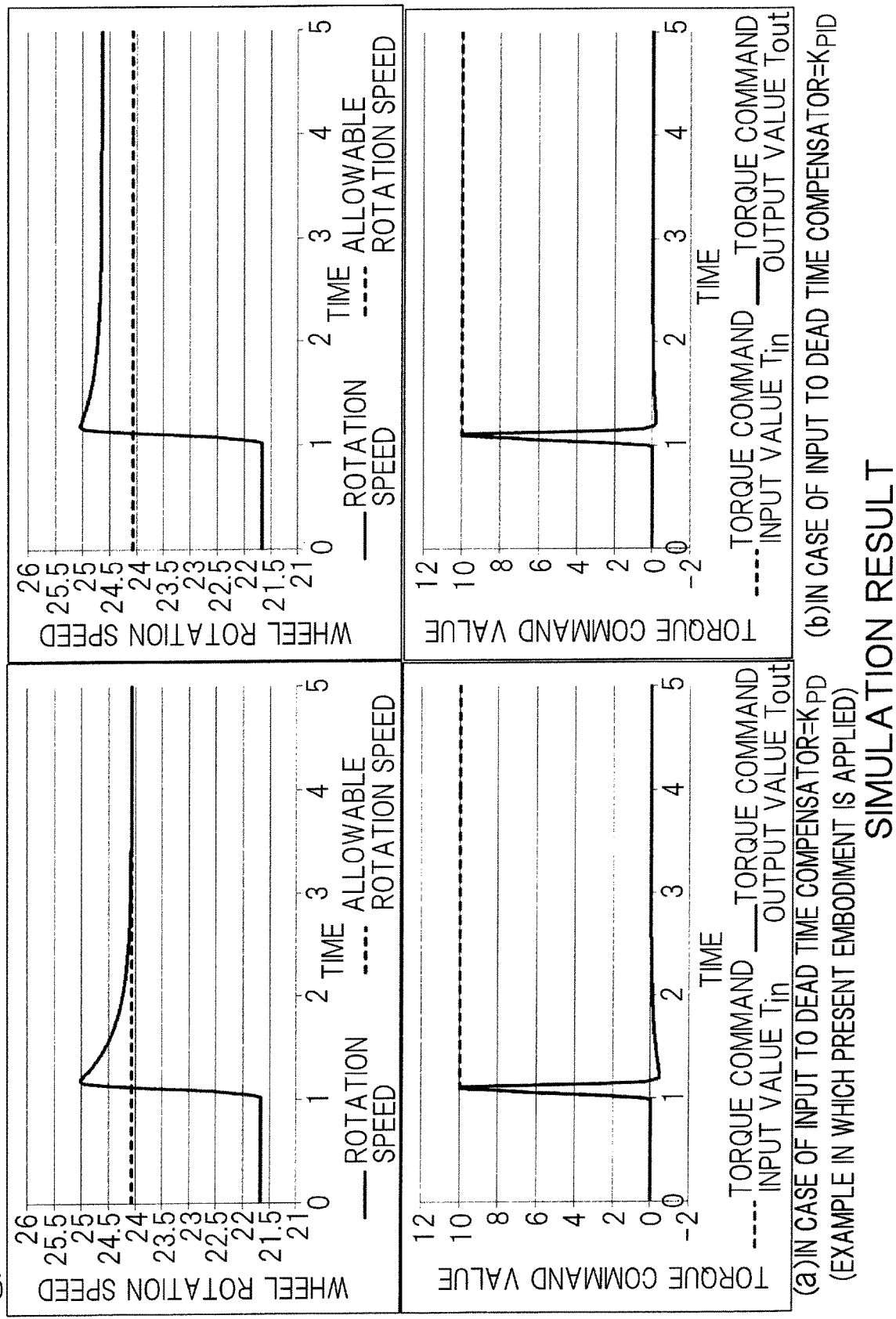
FIG. 3 shows graphs indicating simulation results, of torque command value and wheel rotation speed, that are obtained when no integral compensation is added to an input to a dead time compensator in the slip control device and when an integral compensation is added thereto.

Exemplary simulation results when the rational transfer function G(s) of the control target 20 is set to 1/($I_w$·s), are shown in FIG. 3. $I_w$ represents the moment of inertia of the wheel 7. The results were obtained when an accelerator pedal is intensely depressed at a time "1" during travel at a certain speed. Here, a frictional force from a road surface is assumed to be zero for simplification. Thus, it can be considered that a very low μ road is simulated.

In a case where the sum $K_{PD}$ of the P compensation and the D compensation is used as the input to the dead time compensator 17 by applying the present embodiment (FIG. 3(a)), the steady-state deviation becomes zero after a certain time period elapses. However, in a case where the $K_{PID}$ including also the I compensation is used as the input to the dead time compensator 17 (FIG. 3(b)), the steady-state deviation remains even after a plenty of time period elapses. This is because, although the I compensation acts so as to integrate the deviation thereby to eliminate the steady-state deviation, an output value of the I compensation is inputted to the dead time compensator and the corresponding dead time compensation output is subtracted from the deviation so that the steady-state deviation cannot be made zero as a result.

Operations, effects and advantages of the slip control device 1 having this configuration will be collectively described. The wheel rotation speed $\omega$ of each wheel 7 is monitored, and, when the wheel rotation speed $\omega$ of the wheel 7 exceeds the allowable rotation speed $\omega_t$, the torque compensation value $K_{PID}$ is determined through the PID (control) calculation based on the deviation $\Delta\omega$ between the allowable rotation speed $\omega_t$ and the rotation speed $\omega$ of the wheel, whereby the wheel 7 is inhibited from slipping.

In this case, a magnitude of the integral compensation in the PID calculation is limited as below. That is, the magnitude is limited based on a magnitude of the torque command input value $T_{in}$ for driving or braking that is calculated by the higher-order controller 3 from, for example, a stroke amount of the accelerator pedal 8 or a pedaling force on the brake pedal 9 and that is received by the slip control device 1. Accordingly, responsiveness to changes in a target value and a disturbance (a torque command input value $T_{in}$ received from the higher-order controller 3, and a reaction force, from a road surface, that acts on the tire) can be improved.

The dead time compensator 17 using the Smith method is provided, and, as a torque to be inputted to the dead time compensator 17, the sum of the proportional compensation and the differential compensation excluding the integral compensation from the PID compensation is used. The torque command input value $T_{in}$ for driving or braking received from the higher-order controller 3 by the slip control device 1 is not added to the torque to be inputted to the dead time compensator 17. Accordingly, a steady-state deviation due to the dead time compensation by the integral compensation or a torque command value does not occur, whereby the accuracy of control is improved.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

1 . . . slip control device
2 . . . vehicle controller
3 . . . higher-order controller
4 . . . motor controller
5 . . . electric motor
6 . . . resolver
7 . . . wheel
8 . . . accelerator pedal
9 . . . brake pedal
10 . . . vehicle speed detector
11 . . . acceleration sensor
12 . . . allowable rotation speed calculator
13 . . . PI/PID controller
14, 15, 16 . . . adder
17 . . . dead time compensator
18 . . . control target model
20 . . . control target
21, 22 . . . comparison unit
23 . . . I compensator
24 . . . P compensator
25 . . . D compensator
$K_{PD}$ . . . sum value of proportional and differential compensations
$K_{PID}$ . . . torque compensation value
$T_{in}$ . . . torque command input value
$T_{out}$ . . . torque command output value
$\omega$ . . . rotation speed
$\omega_t$ . . . allowable rotation speed

What is claimed is:

1. A slip control device for inhibiting a tire slip of an automobile in which each wheel serving as a drive wheel is driven by an electric motor, the slip control device comprising:
    an allowable rotation speed calculator configured to calculate an allowable rotation speed of the wheel from vehicle-state information including a vehicle speed and a steering angle;
    a PI/PID controller configured to generate a torque compensation value through PI control or PID control, from a deviation between the allowable rotation speed and a rotation speed of the wheel;
    an adder configured to add the torque compensation value to a torque command input value received from a higher-order controller, thereby obtaining a torque command output value; and
    a dead time compensator which has a control target model including a dead time and which is configured to apply a dead time compensation in generation of the torque compensation value by the Smith method, wherein
    an input to the dead time compensator is an output of P compensation excluding I compensation from PI compensation or is an output of PD compensation excluding I compensation from PID compensation.

2. The slip control device as claimed in claim 1, wherein the input to the dead time compensator does not include the torque command input value given from the higher-order controller.

3. The slip control device as claimed in claim 1, wherein an I compensator included in the PI/PID controller limits a magnitude of the I compensation based on an absolute value of the torque command input value received from the higher-order controller.

4. The slip control device as claimed in claim 1, wherein the dead time compensator subtracts a value outputted from the control target model, from the deviation between the allowable rotation speed and the rotation speed of the wheel, and
    the PI/PID controller generates the torque compensation value through the PI control or the PID control, from the resultant deviation obtained by the subtraction.

5. The slip control device as claimed in claim 1, wherein the rotation speed, of the wheel, that is used by the PI/PID controller is a rotation speed obtained by subtracting, from an actual rotation speed of the wheel, an output from an element of the dead time of the control target model.

* * * * *